United States Patent [19]

Vanacore

[11] Patent Number: 4,682,354
[45] Date of Patent: Jul. 21, 1987

[54] AUTOMATIC CALL COVERAGE FOR UNATTENDED PBX STATIONS

[75] Inventor: Vincent D. Vanacore, Boulder, Colo.

[73] Assignees: AT&T Company; AT&T Information Systems, Inc., both of Holmdel, N.J.

[21] Appl. No.: 677,802

[22] Filed: Dec. 4, 1984

[51] Int. Cl.$^4$ .................. H04M 3/50; H04M 3/54
[52] U.S. Cl. ................................. 379/211; 379/214; 379/266
[58] Field of Search .......... 179/18 BE, 18 AD, 18 B, 179/27 FH, 27 D; 379/211, 210, 214, 266, 157

[56] References Cited

U.S. PATENT DOCUMENTS

| | | | |
|---|---|---|---|
| 3,704,346 | 11/1972 | Smith et al. | 379/157 |
| 4,296,282 | 10/1981 | O'Neil et al. | 379/164 |
| 4,436,962 | 3/1984 | Davis et al. | 379/211 |
| 4,436,963 | 3/1984 | Cottrell et al. | 379/211 |

*Primary Examiner*—Thomas W. Brown
*Attorney, Agent, or Firm*—James M. Graziano

[57] ABSTRACT

An automatic call coverage feature arrangement for unattended PBX stations including attendant consoles. When an incoming call is received at an unattended station, a control processor monitors the number of ring cycles at the called station. The control processor automatically diverts the incoming call to a prescribed coverage station or facility following a prescribed number of ring cycles. Concurrently, the control processor activates an indicator to indicate that the feature is active. Thereafter, the control processor automatically diverts all subsequently received incoming calls from the unattended PBX station to the coverage station or facility. This feature does not require manual activation by a subscriber or an attendant, but is automatically activated in response to a first unanswered incoming call. This allows remote activation of the feature by a subscriber or attendant since all that is required to activate this feature is a first unanswered incoming call to the called station. Thereafter, all subsequent incoming calls are routed to the prescribed covering station or facility until such time as the feature is deactivated.

22 Claims, 2 Drawing Figures

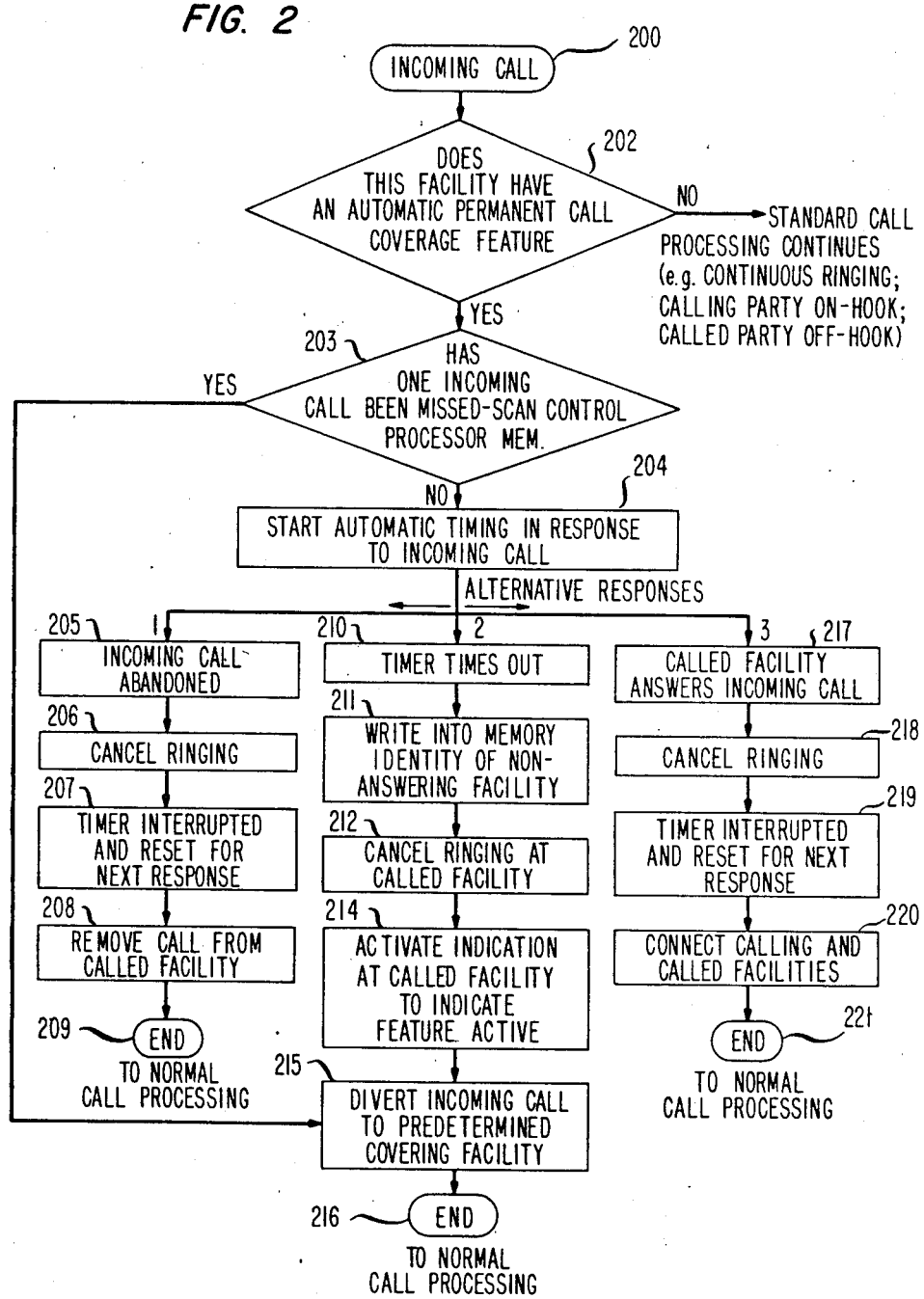

AUTOMATIC CALL COVERAGE FOR UNATTENDED PBX STATIONS

TECHNICAL FIELD

This invention relates to telephone switching systems and, in particular, to a call coverage feature for PBX stations where the call coverage feature is automatically activated in response to unanswered incoming calls at unattended stations.

BACKGROUND OF THE INVENTION

Call coverage features are typically utilized in PBXs having a plurality of stations including attendant consoles. Call coverage features address the problems associated with unanswered incoming calls to stations. Incoming calls usually remain unanswered because a subscriber or an attendant is absent. Call coverage resolves these problems and provides an alternate answering scheme so that all incoming calls to an unattended station can be answered.

Examples of the various call coverage features and schemes are disclosed in U.S. Pat. No. 4,436,962 issued to Davis et al on Mar. 13, 1984 and U.S. Pat. No. 4,436,963 issued to Cottrell et al on Mar. 13, 1984. Call coverage schemes are applicable to a variety of stations including attendant consoles; however, for ease of description, the following examples refer to call coverage features typically associated with subscriber station sets.

One typical call coverage feature is the Send All Calls (SAC) feature. The SAC feature is activated in response to a dialed code from a subscriber's station as entered by an associated subscriber or, if the subscriber station includes feature button, in response to the subscriber activating the feature button. Following the activation of this feature by the subscriber from the associated station set, all further incoming calls to that station set are diverted to an alternate answering facility.

Another typical call coverage scheme is the "Don't Answer" feature. When an incoming call to a subscriber station is not answered following a prescribed number of ring cycles, this feature allows the incoming call to be routed to an alternate answering station or facility. This feature is activated when each incoming call is received at the unatttended called subscriber station. Therefore, each incoming call must cycle through the prescribed number of ring cycles at the called station before the call is diverted to the alternate answering station or facility.

Other types of call coverage schemes are also available to the subscriber or the attendant. However, most call coverage arrangements require a subscriber or an attendant to manually activate the coverage feature at the associated station set or attendant console prior to feature implementation. For example, the SAC feature must be activated at the subscriber station before the incoming calls are routed to the coverage station or facility. If this feature is never activated at the associated subscriber station, incoming calls to the called unattended station remain unanswered. This feature cannot be automatically or remotely activated.

Other call coverage features respond to each incoming call. For example, the "Don't Answer" feature allows the called station to cycle through a prescribed number of ring cycles with each incoming call prior to diverting each incoming call to an alternate answering station or facility. Under conditions, for example, where more than one individual shares an office, the repeated ringing associated with each incoming call to the called station is an annoyance to an individual's office mate. This feature is disadvantageous since call diversion does not take place until each incoming call rings the unattended called station.

The currently available call coverage schemes require either manual activation at the station by a subscriber or an attendant or allow annoying ringing to occur as each incoming call is received at an unattended station.

SUMMARY OF THE INVENTION

The above described problems are overcome by providing an automatic call coverage feature for present and subsequent calls at unattended PBX stations. In particular, a control processor indirectly monitors the port circuits having associated PBX stations including attendant consoles to detect the activity at each station. When an incoming call is received at a subscriber station, for example, the control processor in response to an automatic call coverage feature processing algorithm detects the number of ring cycles associated with the incoming call. If the called station remains unanswered for a specified number of ring cycles, the control processor automatically diverts the incoming call away from the called station to an alternate call coverage station or facility. Concurrently, the control processor activates an indicator, for example, a lamp on the station set, to indicate that the call coverage feature is active. The control processor then automatically diverts all subsequent incoming calls to the alternate station or facility following a first unanswered incoming call. The control processor diverts all subsequent incoming calls from the called station to the alternate station until such time as the subscriber overrides or cancels this call coverage feature. This feature eliminates the need for manual activation of the call coverage feature at the station set or attendant console by a subscriber or an attendant. The unattended called station does not receive any further incoming calls once the feature is automatically activated, and therefore, the called station does not ring with each incoming call. The elimination of the ringing in response to each incoming call prevents annoyances to, for example, an office mate.

Additionally, this call coverage feature may be remotely activated by a subscriber, an attendant or any calling party. The attendant or subscriber, for example, makes a call to his/her particular unattended station set or attendant console from a remote location. The subscriber or attendant allows the station set or attendant console to cycle through the specified number of rings. Following the occurrence of the specified number of rings, the control processor diverts this incoming call to the prescribed coverage station or facility. The control processor then activates the call coverage feature in response to this initial unanswered incoming call. Thereafter, the control processor diverts all subsequent incoming calls to the coverage station or facility. The feature remains active until the subscriber or attendant deactivates this call coverage feature.

The disclosed call coverage feature arrangement provides automatic call coverage for both unattended subscriber stations and attendant consoles. This arrangement prevents the called subscriber station or attendant console from missing an incoming call when the subscriber or attendant is absent from the called station or console and cannot manually activate a call coverage feature. Additionally, the control processor automatically diverts all subsequent incoming calls from the called station or console to the coverage station or facility until the automatic call coverage feature is deactivated.

BRIEF DESCRIPTION OF THE DRAWINGS

The foregoing and other advantages of this invention will be apparent from the following detailed description of an exemplary embodiment thereof, when read in conjunction with the accompanying drawings, in which;

FIG. 2 illustrates a flow chart identifying the steps required to implement the automatic call coverage feature for unattended PBX stations.

DETAILED DESCRIPTION

Figure 1:
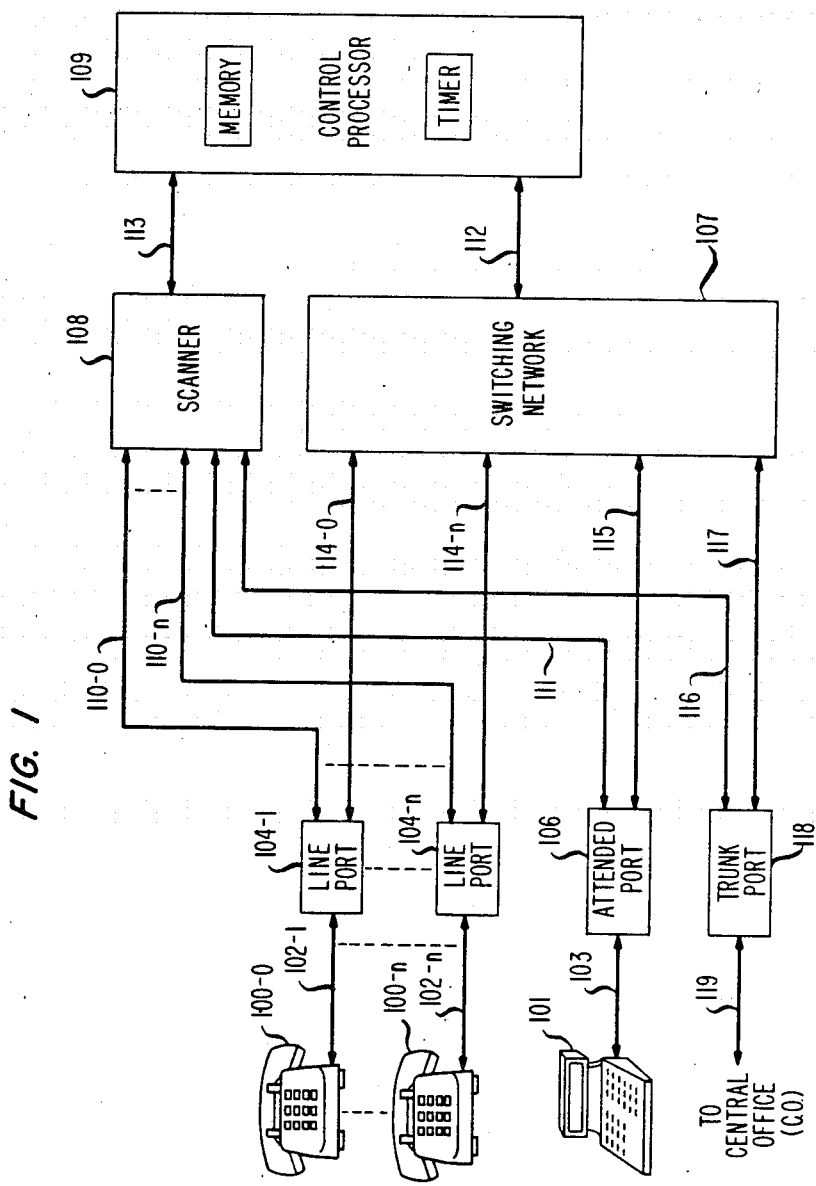
FIG. 1 illustrates a typical telephone switching system.

FIG. 1 discloses a typical telephone switching system serving a plurality of communication devices such as station sets 100-0 through 100-n and attendant console 101 where each station set or attendant console has an associated port circuit 104-1 through 104-n, and 106. The associated port circuits 104-1 and 104-n, and 106 connect over paths 102-1 through 102-n, and 103 to station sets 100-0 through 100-n and attendant console 101. The port circuits interface with the switching network 107. Additionally, the telephone switching system of FIG. 1 connects to a Central Office (C.O.) via trunk port circuit 118 and trunk 119. Incoming and outgoing calls from other PBXs are received and extended over trunk 119 via the C.O.

The telephone switching system of FIG. 1 additionally comprises scanner 108, switching network 107 and control processor 109. Control processor 109 is of the stored program type and controls the interconnections between the communication devices. For ease of discussion, the remainder of this description uses the term station to refer to all tpes of communication devices. Control processor 109 includes a main memory (not shown) and a timer (not shown). the main memory contains various call processing algorithms which are implemented in response to stimulus received from the associated stations. The timer is a decremental timer which starts decrementing in response to a specified stimulus. A stimulus may be an off-hook or on-hook condition of an associated station. Scanner 108 operates under control of control processor 109. Scanner 108 scans, over leads 110-0 through 110-n, 111 and 116, ports 104-1 through 104-n, 106 and 118 to detect the appearance of a stimulus indication (e.g. on-hook, off-hook) as generated from the associated station. The ports 104-1 through 104-n, 106 and 118 receive signals over leads 102-1 through 102-n, 103 and 119 from the associated stations. These signals indicate the condition of the associated stations as generated in response to a stimulus. Scanner 108 detects each change in stimulus (e.g. on-hook to off-hook) and applies an indication of the stimulus over path 113 to control processor 109. Control processor 109 responds to this indication and implements routine call processing algorithms in response to the received stimulus. Control processor 109 generates control information to establish the interconnections between at least two stations. Following the establishment of the interconnection between the stations, switching network 107 serves to exchange "voice or data" between the stations associated with the interconnection established by control processor 109. Switching network 107 is controlled by control processor 109 over lead 112.

Processor 109 controls both the interconnections between stations and the exchange of "voice or data" between the interconnected stations via switching network 107. Processor 109 contains the call processing algorithms which administer the various interconnections. In addition to the routine call processing algorithms, which serve to originate and complete interconnections between stations, the main memory in processor 109 also contains various feature processing algorithms responsive to a variety of service requests received from the associated stations. In response to each service request, the routine call processing algorithm branches to a feature call processing routine to satisfy the service request.

Assume that processor 109 is presently responding to an incoming call where a calling party goes "off-hook" and dials a number which identifies a called station. Processor 109 identifies the called station in response to the "dialed" digits and provides ring-back to the calling station concurrently with ringing at the called station. Processor 109 controls the interconnection between the calling and called stations in response to stored instructions included in its main memory. These instructions comprise the routine call processing algorithm which control the interconnection between the PBX stations.

FIG. 2 illustrates a flow chart identifying the steps required to implement the automatic call coverage feature for unattended stations including an attendant console. Step 200 indicates that control processor 109 is processing an incoming call. Step 202 is included as a step in the routine call processing algorithm. In response to this step, control processor 109 queries its main memory to determine if the automatic call coverage feature is available to the called station. Routine call processing operations continue if the automatic call coverage feature is not available to the called station. Routine operations include: control processor 109 continues to ring the called station, possibly for an indefinite period of time, if the calling party remains off-hook; or control processor 109 establishes the interconnection in response to an off-hook at the called station via switching network 107. Another alternative available is that control processor 109 disengages the calling station from the connection in response to an on-hook stimulus from the calling station.

Additionally, a station subscriber or attendant may not want the feature to be activated while the station set is temporarily unattended even though this feature is available to the called station. Under this condition, a subscriber or attendant can choose to deactivate the automatic call coverage feature by either, for example, dialing a deactivation code or depressing a feature deactivation button on the station. The described deactivation option is not disclosed as a step in the FIG. 2 flow chart since this is merely an implementational option available with the feature and does not comprise a part of the invention. If the feature were deactivated, the routine operations described in the preceding paragraph are available to the called station.

However, if the feature is available to the called station, as step 203 indicates, control processor 109 scans a status memory portion of its main memory. The status memory indicates whether or not this particular called station has previously missed an incoming call, i.e. is this the first or second unanswered incoming call to this called station. Assume that prior to this incoming call, all previous incoming calls to this called station have been answered. Assume further that the called station does not have a subscriber or attendant present when this call is received at the called station. Control processor 109 activates a decremental timer (step 204) in response to the incoming call. The timer corresponds to a specified number of ring cycles. For example, the timer may decrement from 20 to 0 seconds which then allows 3 ring cycles to occur during that 20 second period. The number of allowable ring cycles for a station set is shorter than that allowed for an attendant console since incoming calls to an attendant console are placed in a queue and answered according to queue placement whereas incoming calls to a station set are answered within a small number of rings. In either case, the timer starts decrementing in response to the incoming call and allows a specified number of rings to occur at the called station. Several alternative responses may occur during the prescribed time period.

Step 205 indicates a first alternative response. The calling party goes on-hook and abandons the call. Processor 109 cancels the ringing at the called station, step 206, and interrupts and resets the timer, step 207. Processor 109, then, removes the call from the called station, step 208, and scanner 108 continues normal port scanning operations. With respect to the first alternative response, the call coverage feature is not activated since the calling party chose to abandon the call and the specified numbr of ring cycles did not occur at the called station.

Steps 217 through 220 represent a second alternative response. This response occurs when the subscriber or attendant at the called station goes off-hook or answers the incoming call, step 217. Again, processor 109 cancels the ringing at the called station, step 218, and interrupts and resets the timer, step 219. Processor 109 provides routine call processing to connect the calling and called stations, step 220. Processor 109 establishes the interconnection between the stations and switching network 107 exchanges "voice or data" between the connected stations. Again, since the specified number of ring cycles did not occur, the call coverage feature is not activated.

The remaining alternative response activates the call coverage feature for the associated called station. With this incoming call, the timer decrements to "0" or "times out", step 210. This indicates that a specified number of ring cycles has occurred. Processor 109, as previously indicated, comprises the main memory which further includes the status memory. Following the "time out", control processor 109 responds to the timer's "time out" and writes into the status memory the identity of the called station, step 211. The status memory is of the readable/writeable type, for example, a random access memory (RAM) device. Concurrently, processor 109 cancels the ringing at the called station and activates an indication, e.g. a lamp on the called station set, to indicate that the call coverage feature is activated for that called station, (steps 212 and 214).

Assume, as with most coverage arrangements, that a designated call coverage station or facility is pre-programmed into the memory of processor 109. Following feature activation, processor 109 reads its main memory to determine which station or facility serves as the coverage station or facility for the called station. Processor 109, then, diverts this incoming call to the predetermined coverage station or facility, step 215. Control processor 109 resumes routine call processing to establish a network connection following this diversion of the incoming call. In the above described manner, processor 109 records permanently the identity of the nonanswering station following an initial unanswered incoming call to that called station.

Assume that this recorded station receives a next call. Processor 109, as step 203 indicates, checks its status memory to verify that the called station is recorded and has therefore, already missed an incoming call. Since the feature is now active, the next incoming call to this called station is immediately diverted to the call coverage station or facility. No ringing occurs at the called station. A single unanswered incoming call to a station automatically activates the feature for the called station. Processor 109 immediately branches from the routine call processing algorithm to the call coverage feature algorithm and immediately diverts the incoming call to the call coverage station or facility. The feature is now active for the called station. The activation of this call coverage feature did not require manual activation from a station set or an attendant console. Processor 109 automatically activates this feature in response to a single time-out which occurs in response to an initial unanswered incoming call. This call coverage feature diverts all subsequent incoming calls from the called station to the coverage station or facility. A subscriber or attendant may remotely activate the feature by simply calling the appropriate station requiring coverage.

As previously desribed, an indicator or display indicates feature activation for each individual station. A subscriber or attendant removes or overrides the call coverage feature by activating a button or dialing a code from the individual station. Thereafter, all incoming calls are received by the called station.

While a specific embodiment of the invention has been disclosed, variations in structural detail, within the scope of the appended claims, are possible and are contemplated. There is no intention of limitation to what is contained in the abstract or the exact disclosure as herein presented. The above-described arrangements are only illustrative of the application of the principles of the invention. Normally, other arrangements may be devised by those skilled in the art without departing from the scope and the spirit of the invention.

What is claimed is:

1. In a telephone switching system serving a plurality of station devices connected to associated port circuits where a processor controls interconnections between said port circuits in response to service requests received from said station devices, an automatic call coverage arrangement comprising:

means responsive to a first incoming call to one of said station devices remaining unanswered for a predetermined length of time for storing an indication that said first incoming call has not been answered;

means responsive to said stored indication for routing said first incoming call to a designated coverage facility; and said routing means responsive to said stored indication for additionally routing all subsequently received incoming calls, that are directed to said one station device, to said designated coverage facility in lieu of ringing said one station device.

2. The call coverage arrangement of claim 1 further comprises:

means responsive to the receipt of said first incoming call at said one station device for measuring the length of time said first incoming call remains unanswered; and means responsive to said measuring means for detecting the expiration of said predetermined length of time.

3. The call coverage arrangement of claim 1 wherein said storing means comprises:

means for recording data identifying said one station device; and means responsive to said recorded data for activating an indicator on said one station device to indicate that said call coverage arrangement is active.

4. The call coverage arrangement of claim 3 further comprises:

means for scanning said storing means for said stored indication in response to each subsequently received incoming call directed to said one station device;

means responsive to said scanning means for cancelling ringing at said one station device;

means responsive to said scanning means for transferring said subsequently received incoming calls to said coverage facility; and means responsive to said transferring means for establishing an interconnection between said one station device and said designated coverage facility.

5. In a telephone switching system serving a plurality of station devices where a processor controls interconnections between two or more station devices, a method of providing automatic call coverage to one or more of said station devices comprising the steps of:

recording an unanswered call indication in response to a first incoming call directed to one of said station devices remaining unanswered for greater than a predetermined length of time;

routing, in response to said unanswered call indication, said first incoming call to a designated coverage facility; and routing, in response to said unanswered call indication, subsequently received incoming calls directed to said one station device to said designated coverage facility in lieu of ringing said one station device.

6. The method of claim 5 wherein said step of recording further includes:

activating a timer in response to the receipt of said first incoming call at said one station device for measuring the length of time said first incoming call remains unanswered; and detecting the expiration of said predetermined length of time.

7. The method of claim 5 wherein said step of recording further includes:

identifying said one station device;

storing, in a memory of said processor, data identifying said one station device; and activating an indicator on said one station device to indicate that said call coverage arrangement is active.

8. The method of claim 7 wherein said method further includes the steps of:

scanning said memory of said processor for said stored data in response to each subsequently received incoming call directed to said one station device; and transferring each of said subsequently received incoming calls, directed to said one station device, to said designated coverage facility.

9. In a telephone switching system serving a plurality of communication devices having associated port circuits where a processor controls interconnections between said port circuits in response to service requests received from said port circuits, an automatic call coverage arrangement comprising:

means responsive to an incoming call to one of said communication devices remaining unanswered for greater than a predetermined time for storing an indication that said incoming call has not been answered;

means responsive to said stored indication for routing said incoming call from said one communication device to a designated coverage facility; and said routing means responsive to said stored indication for immediately routing all subsequently received incoming calls, that are directed to said one communication device, to said designated coverage facility in lieu of said one communication device receiving any additional incoming calls.

10. The call coverage arrangement of claim 9 wherein said storing means comprises:

means for identifying said one communication device; and means responsive to said identification for recording data identifying said identified one communication device.

11. The call coverage arrangement of claim 10 wherein said storage means additionally comprises:

means responsive to said recording means for activating an indicator on said one communication device to indicate that said call coverage arrangement is active.

12. The call coverage arrangement of claim 11 further comprising:

means for scanning said storing means for said recorded data in response to said subsequently received incoming calls directed to said one communication device; and means responsive to said scanning means for transferring said subsequently received incoming calls directed to said one communication device to said coverage facility.

13. In a telephone switching system serving a plurality of communication devices where a processor controls interconnections between two or more communication devices, a method of providing automatic call coverage to one or more communication devices where said method comprises the steps of:

generating in response to a receipt of an incoming call at one of said communication devices an indication specifying an elapsed time period during which said incoming call remains unanswered;

recording said indication indicating that said first incoming call has not been answered;

routing in response to said indication said incoming call from said one of said communication devices to a designated coverage facility; and routing in response to said indication all subsequently received incoming calls to said designated coverage facility in lieu of said one of said communication devices receiving any additional incoming calls.

14. The method of claim 13 wherein the step of recording further includes:

identifying said one of said communication devices associated with said elapsed time period; and storing a representation of said identified one of said communication devices.

15. The method of claim 13 wherein said method further comprises the step of:

activating an indicator on said one of said communication devices to indicate that said automatic call coverage is active.

16. The method of claim 13 wherein said method further includes the steps of:

scanning a memory of said processor for said indication in response to each subsequently received incoming call at said one of said communication devices; and transferring said subsequently received incoming calls from said one of said communication devices to said designated coverage facility.

17. In a telephone switching system serving one or more attendant consoles connected to associated port circuits where a processor controls connections to said one or mroe attendant consoles by placing incoming calls in an answering queue such that each call is sequentially answered according to queue placement, an automatic call coverage arrangement comprising:

means responsive to a first incoming call to one of said attendant consoles remaining unanswered for a predetermined length of time for storing an indication that said first incoming call has not been answered;

means responsive to said stored indication for routing said first incoming call to a designated coverage facility; and said routing means responsive to said stored indication for additionally routing all subsequently received incoming calls, that are directed to said one attendant console to said designated coverage facility prior to queue placement.

18. The call coverage arrangement of claim 17 wherein said storing means comprises:

means for recording data identifying said one attendant console; and means responsive to said recorded data for activating an indicator on said one attendant console to indicate that said call coverage arrangement is active.

19. The call coverage arrangement of claim 17 further comprising:

means for scanning said recorded data in response to each subsequently received incoming call directed tosaid one attendant console; and means responsive tosaid scanning means for transferring prior to queue placement said subsequently received incoming calls from said one attendant console to said designated coverage facility.

20. In a telephone switching system serving one or more attendant consoles where a processor controls connections to said attendant consoles by placing incoming calls in an answering queue such that each call is sequentially answered according to queue placement, a method of providing automatic call coverage to said attendant consoles where said method comprises the steps of:

recording an unanswered call indication in response to an incoming call directed to one of said attendant consoles remaining unanswered for greater than a predetermined length of time;

routing, in response to said unanswered call indication, said incoming call to a designated coverage facility; and routing, in response to said unanswered call indication, all subsequently received incoming calls that are directed to said one attendant console to said coverage facility prior to answering queue placement.

21. The method of claim 10 wherein said method further includes the steps of:

identifying said one of said attendant consoles in response to expiration of said predetermined time;

storing a representation of said one of said attendant consoles; and activating an indicator on said one of said attendant consoles to indicate that said automatic call coverage is active.

22. The method of claim 21 wherein said method further includes the steps of:

scanning a memory of said processor for said stored representation in response to each subsequently received incoming call at said one of said attendant consoles; and transferring prior to answering queue placement all of said subsequently received incoming calls from said one of said attendant consoles to said designated coverage facility.

* * * * *